Patented July 18, 1933

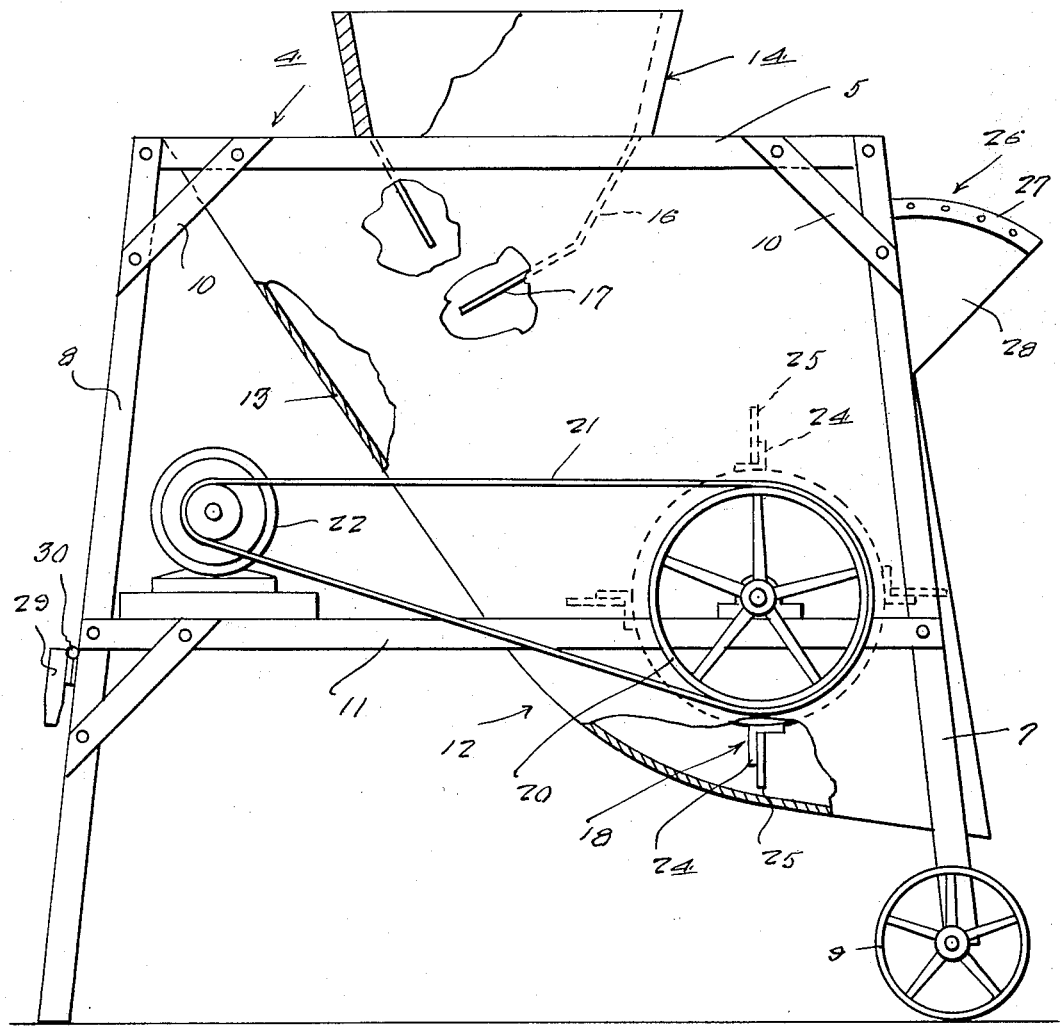

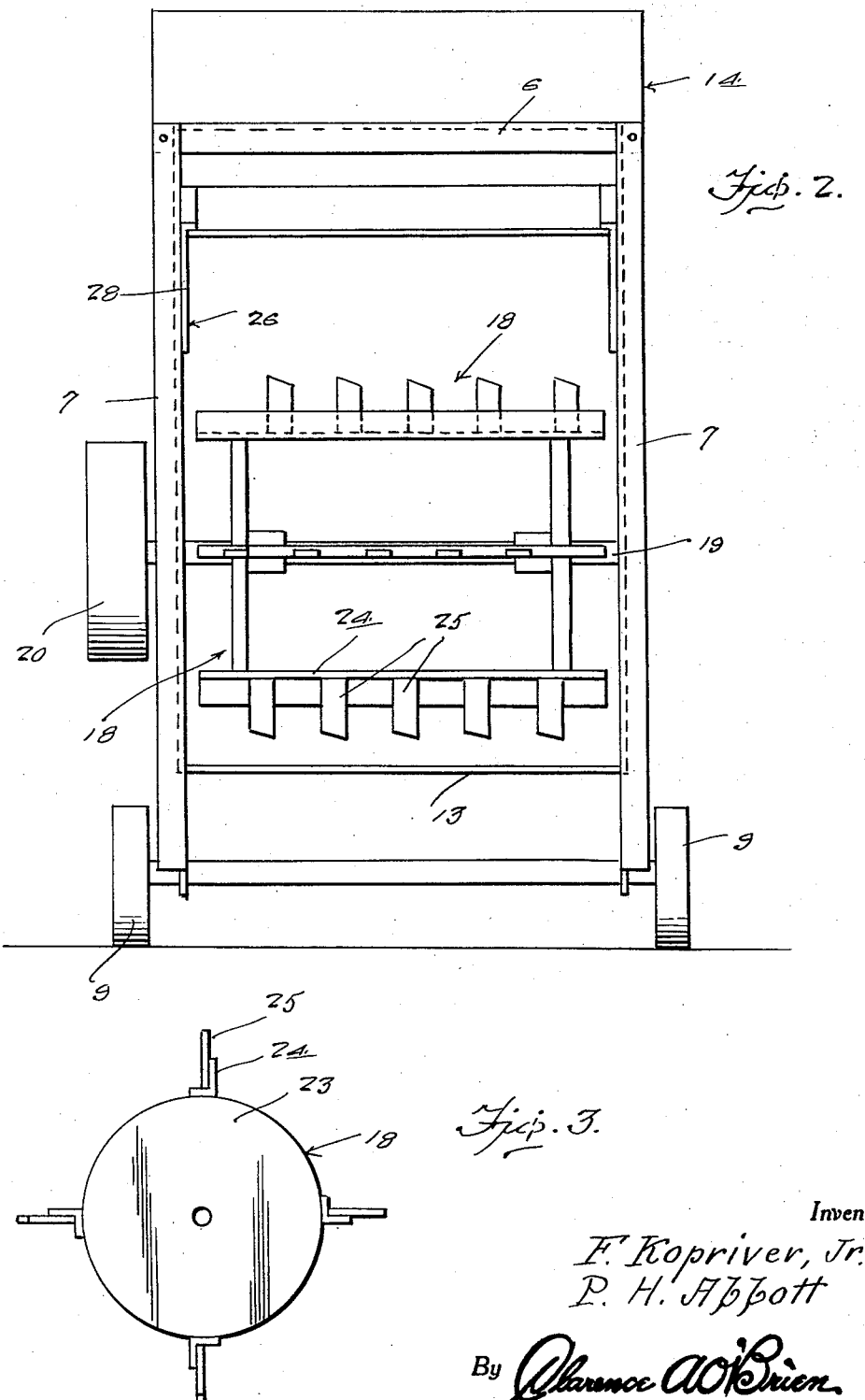

1,918,917

UNITED STATES PATENT OFFICE

FRANK KOPRIVER, JR., OF DUQUESNE, AND PETER HENRY ABBOTT, OF WEST NEWTON, PENNSYLVANIA

SOIL PULVERIZING AND REFINING APPARATUS

Application filed September 10, 1931. Serial No. 562,156.

The present invention covers a novel and improved apparatus for agitating, pulverizing and conditioning soil to provide a resultant product of desired consistency for efficient usage.

The apparatus is primarily designed for use in green houses, but is equally well adapted for out-of-door use by gardeners, landscape attendants and the like.

Our primary aim is to provide a structure which will promote efficiency in conditioning the soil, said structure being characterized by simplicity and economy and embodying a portable carriage to facilitate movement from place to place.

The exact mechanical part selected for constructing the apparatus will become more readily apparent from the following description and drawings.

In the drawings:—

Figure 1 is a side view in section and elevation showing the general assembly as developed in accordance with the present invention.

Fig. 2 is a front view observing Fig. 1 in a direction from right to left.

Fig. 3 is an end view of the rotary agitator employed for pulverizing purposes.

The carriage comprises a suitable frame structure embodying a top frame 4, including side and end rails 5 and 6. Depending from the corner portions of this frame are substantially vertical supporting legs, there being a pair of front legs 7 and a pair of rear legs 8. The legs 7 terminate short of the ground and are provided with transporting wheels 9. The legs 8 are of such length as to rest on the ground to maintain the carriage stationary while the machine is in operation. The numerals 10 designate the suitable braces, while the numerals 11 represent horizontal guide rails, both in spaced parallelism.

Mounted on this wheeled carriage is a receiver 12 comprising a casing closed at its top, but open along its vertical front sides for discharging the soil. This receiver is preferably of the configuration shown in Fig. 1 and includes an inclined curvate bottom 13 which serves as a soil chute. The interior of the receiver functions as a mixing and separating chamber.

The top wall of the receiver is formed with an opening with which the intake or feed hopper 14 registers and extending down from this hopper and into the interior of the receiver are inclined cooperable baffles 15 and 16. The baffle 16 is formed with an extension 17 forming a rearwardly discharging outlet slot for the incoming soil. Thus the soil is discharged by gravity against the inclined chute 13, and it rolls down the chute where it is acted upon by the rotary agitator 18. This agitator comprises a shaft journaled in appropriate bearings and provided on one end with a pulley 20 over which a propulsion belt 21 is trained. This belt is driven from a pulley on an electric motor 22 supported from the rails 11.

The rotor or agitator 18 includes end heads 23 supporting circumferentially spaced angle irons 24 carrying suitably arranged pulverizing and separating teeth 25.

The numeral 26 represents a frontal guard arranged near the upper portion of the discharge side of the receiver, this including a curved top wall 27 and suitably shaped segmental end walls 28. This aids in casting the dirt, which would otherwise be thrown upwardly, down to the ground, where it is piled. The numeral 29 designates one of a pair of hand grips hingedly mounted on the frame structure as at 30. This permits the carriage to be wheeled, somewhat like a wheel barrow from place to place.

In practice, the unconditioned raw soil is dumped into the receiver 12 through the medium of the hopper 14. The baffles 15 and 16 serve to feed said soil at requisite speed into the receiver and it drops by gravity to the lower portion of the receiver, where it is acted upon by the blade 24 and teeth 25 of the rotary agitator. This agitator rotates in a clockwise direction and functions as a beater, thus pulverizing or shredding the soil and throwing it out through the open front of the receiver into a pile. After the pile is built up, at a point to interfere with the free discharge of the refined soil, the handles 29 are grasped, the carriage is lifted and wheeled to the desired spot to continue the soil conditioning work.

It is thought from the foregoing description that the advantages and novel features of the invention will be readily apparent.

It is to be understood that changes may be made in the construction and in the combination and arrangement of the several parts, provided that such changes fall within the scope of the appended claim.

Having thus described our invention, what we claim as new is:—

A soil conditioning, pulverizing and refining apparatus comprising a portable support, an open front casing suspended on said support and including a horizontal top having a feed opening, a pair of spaced parallel side walls, and a connective bottom wall between said side walls, said bottom wall being of curvate configuration and downwardly inclined to function as a chute, a rotary pulverizer mounted in the lower portion of said casing and cooperable with the discharge end of said chute, said pulverizer comprising a rotatably mounted shaft, and heads connected to said shaft, circumferentially spaced angle irons connected to the peripheral portion of said head, and longitudinally spaced teeth carried by said angle irons.

PETER HENRY ABBOTT.
FRANK KOPRIVER, Jr.